United States Patent
Huang et al.

(10) Patent No.: US 12,182,724 B2
(45) Date of Patent: Dec. 31, 2024

(54) METHOD AND APPARATUS FOR GENERATING TEMPORAL KNOWLEDGE GRAPH, DEVICE, AND MEDIUM

(71) Applicant: BEIJING BAIDU NETCOM SCIENCE AND TECHNOLOGY CO., LTD., Beijing (CN)

(72) Inventors: Fang Huang, Beijing (CN); Shuangjie Li, Beijing (CN); Yabing Shi, Beijing (CN); Ye Jiang, Beijing (CN); Yang Zhang, Beijing (CN); Yong Zhu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 1140 days.

(21) Appl. No.: 17/025,952

(22) Filed: Sep. 18, 2020

(65) Prior Publication Data
US 2021/0216882 A1 Jul. 15, 2021

(30) Foreign Application Priority Data
Jan. 15, 2020 (CN) .......................... 202010041805.6

(51) Int. Cl.
G06N 5/02 (2023.01)
G06N 5/04 (2023.01)
G06N 20/00 (2019.01)

(52) U.S. Cl.
CPC .................. *G06N 5/02* (2013.01); *G06N 5/04* (2013.01); *G06N 20/00* (2019.01)

(58) Field of Classification Search
CPC ............ G06N 5/02; G06N 5/04; G06N 20/00; G06N 3/045; G06N 3/044; G06N 5/022;
(Continued)

(56) References Cited

U.S. PATENT DOCUMENTS

| 10,860,934 | B2* | 12/2020 | Lindsley | .................. G06N 5/02 |
| 2009/0144609 | A1* | 6/2009 | Liang et al. | .................. 715/230 |
| 2018/0082183 | A1* | 3/2018 | Hertz et al. | .............. G06N 5/00 |

FOREIGN PATENT DOCUMENTS

| CN | 108427735 A | 8/2018 |
| CN | 109376864 A | 2/2019 |

(Continued)

OTHER PUBLICATIONS

Liu, Y. et al. (2019). Context-Aware Temporal Knowledge Graph Embedding. In: Cheng, R., Mamoulis, N., Sun, Y., Huang, X. (eds) Web Information Systems Engineering—WISE 2019. WISE 2020. Lecture Notes in Computer Science( ), vol. 11881. Springer, Cham. https://doi.org/10.1007/978-3-030-34223-4_37.*

(Continued)

*Primary Examiner* — Luis A Sitiriche
(74) *Attorney, Agent, or Firm* — Knobbe Martens Olson & Bear, LLP (57) ABSTRACT

A method and apparatus for generating a temporal knowledge graph, a device and a medium. An embodiment comprises: acquiring corpus including time information; performing multivariate data extraction on the corpus, multivariate data including an entity pair, an entity relationship and a target time interval of the entity relationship, the target time interval being used to indicate a valid period of the entity relationship; and generating a temporal knowledge graph based on the entity pair, the entity relationship and the target time interval of the entity relationship.

18 Claims, 3 Drawing Sheets

(58) Field of Classification Search
CPC .......... G06N 3/04; G06N 3/08; G06N 5/025; G06N 5/027; G06N 7/01; G06F 16/367; G06F 40/35; G06F 40/30; G06F 16/9024; G06F 16/2264; G06F 16/2477; G06F 16/36; G06F 40/295; G06F 16/35; G06F 16/951; G06F 16/288; G06F 40/205; G06F 40/216; G06F 16/18; G06F 16/355; G06F 18/24; G06F 40/211; G06F 40/289; G06F 40/151; G06F 40/268; G06F 40/284; G06F 16/00; G06F 16/244; G06F 16/24556; G06F 16/24564; G06F 16/252; G06F 16/334; G06F 16/906; G06F 16/93; G06F 16/9537; G06F 18/214; G06F 18/22; G06F 40/226; G06F 40/253; G06F 40/258; G06F 40/279
See application file for complete search history.

(56) References Cited

FOREIGN PATENT DOCUMENTS

| | | | |
|---|---|---|---|
| CN | 109785968 | A | 5/2019 |
| CN | 109933674 | A | 6/2019 |
| CN | 110119355 | A | 8/2019 |
| CN | 110147450 | A | 8/2019 |
| CN | 110489395 | A | 11/2019 |
| CN | 110516160 | A | 11/2019 |
| CN | 110543574 | A | 12/2019 |
| CN | 110569345 | A | 12/2019 |
| EP | 3404568 | A1 | 11/2018 |
| JP | 2017076403 | A | 4/2017 |
| JP | 2019526131 | A | 3/2019 |
| WO | WO 2012092934 | A1 | 7/2012 |

OTHER PUBLICATIONS

Simon Gottschalk and Elena Demidova. 2018. EventKG: A Multilingual Event-Centric Temporal Knowledge Graph. In The Semantic Web: 15th International Conference, ESWC 2018, Heraklion, Crete, Greece, Jun. 3-7, 2018, Proceedings. Springer-Verlag, Berlin, Heidelberg, 272-287. https://doi.org/10.1007/978-3-319-93417-4_18.*
Farah Benamara, Maite Taboada, Yannick Mathieu; Evaluative Language Beyond Bags of Words: Linguistic Insights and Computational Applications. Computational Linguistics 2017; 43 (1): 201-264. doi: https://doi.org/10.1162/COLI_a_00278.*
V. Devisree, P.C. Reghu Raj, A Hybrid Approach to Relationship Extraction from Stories, Procedia Technology, vol. 24, 2016, pp. 1499-1506, ISSN 2212-0173, https://doi.org/10.1016/j.protcy.2016.05.101.*
Liu, Y. et al. (2019). Context-Aware Temporal Knowledge Graph Embedding. In: Cheng, R., Mamoulis, N., Sun, Y., Huang, X. (eds) Web Information Systems Engineering—WISE 2019. WISE 2020. Lecture Notes in Computer Science( ), vol. 11881. Springer, Cham.*
Simon Gottschalk and Elena Demidova. 2018. EventKG: A Multilingual Event-Centric Temporal Knowledge Graph. In The Semantic Web: 15th International Conference, ESWC 2018, Heraklion, Crete, Greece, Jun. 3-7, 2018, Proceedings. Springer-Verlag, Berlin, Heidelberg, 272-287.*
Report of WG1 State of the Art, Evaluation and Recommendations regarding "Document Processing and Visualization Techniques" by EPFL, Switzerland (2003).*
D. Sarkar, "Semantic and sentiment analysis" in Text Analytics with Python, 2016, ISBN: 978-1-4842-2387-1, https://doi.org/10.1007/978-1-4842-2388-8_7.*
Farah Benamara, Maite Taboada, Yannick Mathieu; Evaluative Language Beyond Bags of Words: Linguistic Insights and Computational Applications. Computational Linguistics 2017; 43 (1): 201-264.*
V. Devisree, P.C. Reghu Raj, A Hybrid Approach to Relationship Extraction from Stories, Procedia Technology, vol. 24, 2016, pp. 1499-1506, ISSN 2212-0173.*
García-Durán, et al., "Learning Sequence Encoders for Temporal Knowledge Graph Completion," *Proceedings of the 2018 Conference on Empirical Methods in Natural Language Processing*, pp. 4816-4821 Brussels, Belgium. Oct. 31-Nov. 4, 2018. © 2018 Association for Computational Linguistics.
Official Communication in Japanese Patent Application No. 2021-004678, dated Jul. 12, 2022 in 4 pages.
Gottschalk, et al., EventKG: A multilingual event-centric temporal knowledge graph, A. Gangerni et al (Eds): ESWC 2018, LNCS 10843:272-287 (2018).
Liu, et al., Context-aware temporal knowledge graph embedding, R. Cheng et al. (Eds): WISE 2019, LNCS 11881:583-598 (2019).

* cited by examiner

METHOD AND APPARATUS FOR GENERATING TEMPORAL KNOWLEDGE GRAPH, DEVICE, AND MEDIUM

CROSS-REFERENCE TO RELATED APPLICATIONS

This application claims priority to Chinese Patent Application No. 202010041805.6, filed with the China National Intellectual Property Administration (CNIPA) on Jan. 15, 2020, the contents of which are incorporated herein by reference in their entirety.

TECHNICAL FIELD

Embodiments of the present disclosure relate to the computer technology, specifically to the knowledge graph technology, and particularly to a method and apparatus for generating a temporal knowledge graph, a device and a medium.

BACKGROUND

A knowledge graph is a semantic network that represents real world knowledge using structured information from a semantic point of view, and may formally describe things in real world and their interrelationship. Knowledge refers to a description about objective facts of the real world in the knowledge graph, generally includes an entity pair (subject S—object O pair) and a relationship (P) therebetween, and is represented in a form of an SPO triplet.

However, at present, the general knowledge triplet can not precisely express the time of the knowledge, and can only express the time simply through discrete time states. In addition, as a measure, the time itself may be calculated. Since the precision of expression of the time of the knowledge is not high, the knowledge does not support the calculation of the time information.

SUMMARY

Embodiments of the present disclosure disclose a method and apparatus for generating a temporal knowledge graph, a device and a medium, to propose an approach to generating a temporal knowledge graph based on a structured data format containing a time interval, to unify and normalize formats of data constructing the temporal knowledge graph, thus improving the precision of expression of the time information of knowledge in the knowledge graph.

In a first aspect, some embodiments of the present disclosure provide a method for generating a temporal knowledge graph, the method includes: acquiring corpus including time information; performing multivariate data extraction on the corpus, the multivariate data including an entity pair, an entity relationship and a target time interval of the entity relationship, the target time interval being used to indicate a valid period of the entity relationship; and generating the temporal knowledge graph based on the entity pair, the entity relationship and the target time interval of the entity relationship.

An embodiment of the above disclosure has following advantages and beneficial effect: an approach to generating a temporal knowledge graph based on a structured data format containing a time interval is proposed, and the formats of the data constructing the temporal knowledge graph are unified and normalized, such that the valid period of the entity relationship of the each entity pair may be accurately expressed in the temporal knowledge graph, thus improving the precision of expression of the time information. Moreover, the knowledge calculation in the time dimension may be supported based on the time interval of the entity relationship.

Alternatively, a process of extracting the target time interval of the entity relationship includes: obtaining a plurality of time intervals of the entity relationship through the multivariate data extraction; and performing fusion on the plurality of time intervals to obtain the target time interval.

An embodiment of the above disclosure has following advantages and beneficial effect: the accuracy and the completeness of a valid time interval of each entity relationship in the knowledge graph are ensured.

Alternatively, the performing fusion on the plurality of time intervals to obtain the target time interval includes: screening the plurality of time intervals according to a confidence level of each time interval in the plurality of time intervals; and integrating the screened time intervals in a chronological order, to obtain the target time interval.

Alternatively, the screening the plurality of time intervals according to the confidence level of each time interval in the plurality of time intervals includes: counting, in the corpus, a number of data sources corresponding to the each time interval in the plurality of time intervals; determining the confidence level of the each time interval according to the number; and screening the plurality of time intervals according to the confidence level.

Alternatively, the method further includes: determining whether a null value exists at a time starting point and a time end point of the target time interval; and in response to the null value existing, determining a validity of the null value using candidate corpus from a source different from current corpus.

Alternatively, the performing a multivariate data extraction on the corpus includes: performing a characteristic extraction on each statement in the corpus, by using a pre-trained characteristic extraction model; and classifying and annotating, based on an extracted characteristic of the each statement, a phrase in the each statement to obtain the multivariate data.

An embodiment of the present disclosure has the following advantages or beneficial effects: the solution in this embodiment supports flexibly and discriminatively extracting the data in the multivariate data according to the text structure and the topic of the text in the corpus and by using the different knowledge extraction approaches, which facilitates improving the efficiency and the accuracy of the knowledge extraction.

Alternatively, the method further includes: training to obtain a multivariate data extraction model by using a training corpus set and an annotation result of multivariate data of each statement in the training corpus set, to perform the characteristic extraction and the classification and annotation using the multivariate data extraction model.

Alternatively, the performing a multivariate data extraction on the corpus includes: analyzing a topic or a text structure of a text in the corpus; and in response to the topic of the text belonging to a preset topic or the text structure belonging to a preset text structure, extracting the multivariate data by using different data extraction approaches.

Alternatively, the extracting the multivariate data by using different data extraction approaches includes: extracting the entity relationship from a statement of the text according to a preset relationship extraction approach, the preset relationship extraction approach referring to a predefined approach for determining an entity relationship based on a knowledge extraction need; and obtaining the entity pair and the target time interval of the entity relationship by performing a characteristic extraction on the statement in the text and by classifying and annotating a word of the statement.

Alternatively, after the performing a multivariate data extraction on the corpus, the method further includes: disambiguating, according to a knowledge extraction need, any argument in the extracted entity pair and the extracted entity relationship; and fusing the disambiguated entity pair and the disambiguated entity relationship.

An embodiment of the present disclosure has the following advantages or beneficial effects: through post-processing operations such as a knowledge disambiguation operation and a knowledge fusion operation, the accuracy of the expression and the comprehensiveness of the knowledge of the multivariate data for constructing the temporal knowledge graph may be improved.

Alternatively, the acquiring corpus including time information includes: obtaining the corpus including the time information by recognizing the time information, where the time information includes time recorded in a body text of the corpus, push time of corpus data, update time of the corpus data, and time indirectly acquired based on a corpus source.

An embodiment of the present disclosure has the following advantages or beneficial effects: by screening, according to the time information, the corpus used for the current knowledge extraction, the pertinence and the quality of the available corpus are ensured, thus improving the efficiency of the knowledge extraction.

In a second aspect, some embodiments of the present disclosure provide an apparatus for generating a temporal knowledge graph, the apparatus includes: a corpus acquiring module, configured to acquire corpus including time information; a data extracting module, configured to perform multivariate data extraction on the corpus, the multivariate data including an entity pair, an entity relationship and a target time interval of the entity relationship, the target time interval being used to indicate a valid period of the entity relationship; and a graph generating module, configured to generate the temporal knowledge graph based on the entity pair, the entity relationship and the target time interval of the entity relationship.

In a third aspect, some embodiments of the present disclosure provide an electronic device, the electronic device includes: at least one processor; and a storage device, communicated with the at least one processor, where the storage device stores an instruction executable by the at least one processor, and the instruction is executed by the at least one processor, to enable the at least one processor to perform the method according to any one of embodiments of the present disclosure.

In a fourth aspect, some embodiments of the present disclosure provide a non-transitory computer readable storage medium, storing a computer instruction, wherein the computer instruction is used to cause the computer to perform the method according to any one of embodiments of the present disclosure.

According to the technical solution of the embodiments of the present disclosure, by simultaneously extracting the entity pair, the entity relationship and the target time interval of the entity relationship, an approach to generating a temporal knowledge graph based on a structured data format containing a time interval is proposed, and the formats of the data constructing the temporal knowledge graph are unified and normalized, such that the valid period of the entity relationship of the each entity pair may be accurately expressed in the temporal knowledge graph, and thus, the problem in the existing technology that the precision of expression of the time information in the knowledge graph is low is solved, thus improving the precision of expression of the time information. Moreover, the knowledge calculation in the time dimension may be supported based on the time interval of the entity relationship, thus improving the flexible use of the temporal knowledge. Furthermore, the temporal knowledge graph can support more abundant scenarios in which knowledge information needs to be provided.

BRIEF DESCRIPTION OF THE DRAWINGS

Accompanying drawings are used for a better understanding of the scheme, and do not constitute a limitation to the present disclosure. Here.

DETAILED DESCRIPTION OF EMBODIMENTS

Example embodiments of the present disclosure are described below in combination with the accompanying drawings, and various details of embodiments of the present disclosure are included in the description to facilitate understanding, and should be considered as example only. Accordingly, it should be recognized by one of ordinary skill in the art that various changes and modifications may be made to the embodiments described herein without departing from the scope and spirit of the present disclosure. Also, for clarity and conciseness, descriptions for well-known functions and structures are omitted in the following description.

Figure 1:
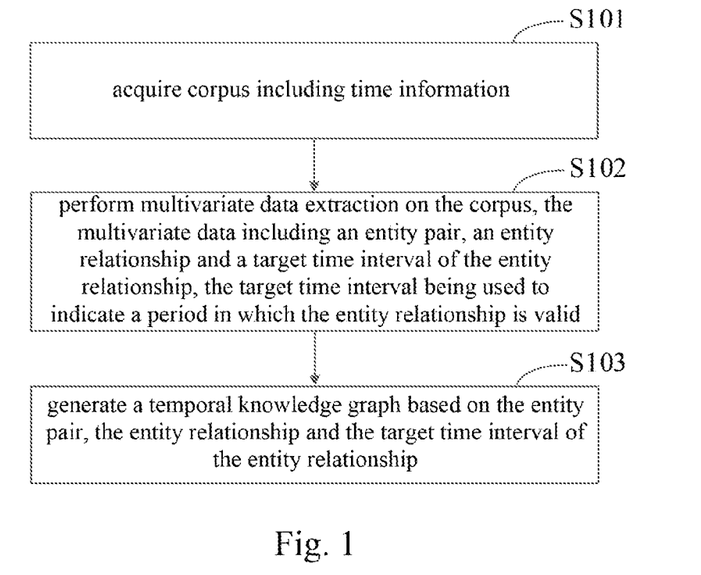
FIG. 1 is a flowchart of a method for generating a temporal knowledge graph disclosed according to an embodiment of the present disclosure.

FIG. 1 is a flowchart of a method for generating a temporal knowledge graph according to an embodiment of the present disclosure. This embodiment may be applicable to a situation where a temporal knowledge graph including a time interval, in which an entity relationship is valid, is constructed by performing a knowledge extraction on corpus. The method in this embodiment may be performed by an apparatus for generating a temporal knowledge graph. This apparatus may be implemented by means of software and/or hardware, and may be integrated on any electronic device having a computing capability, for example, a server.

As shown in FIG. 1, the method for generating a temporal knowledge graph disclosed in this embodiment includes:

S101, acquiring corpus including time information.

In this embodiment, the corpus may be derived from a web page, an encyclopedia database, etc., and different knowledge extraction needs, the web page may include various topic categories such as education, science and technology, and sports. After the corpus is acquired preliminarily, the preliminarily acquired corpus is screened using a keyword representing the time information, so as to obtain the corpus including the time information.

For example, the acquiring corpus including time information includes: obtaining the corpus including the time information by recognizing the time information, the time information including time recorded in the body text of the corpus, push time of corpus data, update time of the corpus data, and time indirectly acquired based on a corpus source. For corpus from different sources, the time information therein may be recognized by different approaches. For example, for web page data, the time information may be recognized from the body text of the web page using a text recognition technique, or the time information may be indirectly acquired using web page update time or according to a specific web page label/position. For the encyclopedia database, the time information may be acquired by data text recognition, by using data push time, or the like.

Before the multivariate data extraction is performed, in addition to the screening performed on the preliminarily acquired corpus according to the time information, the preliminarily acquired corpus may be screened based on the current knowledge extraction need and according to a preset condition such as the reliability of a corpus source, the quality of text content, and the type of a text topic, thereby ensuring the quality of the corpus used for the current knowledge extraction.

S102, perform multivariate data extraction on the corpus, the multivariate data including an entity pair, an entity relationship and a target time interval of the entity relationship, the target time interval being used to indicate a period in which the entity relationship is valid.

After the corpus including the time information is acquired, the text in the corpus is segmented according to punctuation marks or paragraph division. Then, the multivariate data extraction is performed based on the segmented text. The data extraction is implemented by: adopting a pre-trained multivariate data extraction model, or recognizing the entity pair, a keyword for representing the entity relationship and a keyword for representing the time information, or the like. The implementation approach is not specifically limited in this embodiment. Furthermore, according to the specific implementation of the data extraction, a format conversion may be performed on the text data in the corpus to obtain text data recognizable in the extraction process.

Each entity pair includes two arguments: a subject and an object. The entity relationship is used to represent a relationship or an attribute between the subject and the object. Each entity relationship is valid within a corresponding target time interval, and the entity relationship is invalid beyond the target time interval. By adding a valid time interval to each entity relationship in the knowledge graph, the precision of expression of the time information in the knowledge graph is improved, which is conducive to a subsequent knowledge calculation for the entity relationship in the time dimension. For example, by performing the knowledge extraction according to the method in this embodiment, that A served as the president of country B from 2009 to 2013 may be determined. In combination with the statistical information of the previous presidents of country B before 2009, the information of the x-th president of country B may be calculated according to the sort of time intervals.

Alternatively, the multivariate data may be in a form of five-tuple data, including the subject, the entity relationship, the object, a relationship validity time starting point (from value), and a relationship failure time end point (to value). The relationship validity time starting point and the relationship failure time end point compose a time interval. Thus, unification and normalization of formats of data constructing the knowledge graph are implemented. Obviously, if there is a need to add other argument data, the multivariate data may also take the form of data having arguments more than arguments of five dimensions, thereby achieving the effect that the data may be flexibly expanded.

Alternatively, the process of extracting the target time interval of the entity relationship includes: obtaining a plurality of time intervals of the entity relationship through the multivariate data extraction; and performing fusion on the plurality of time intervals to obtain the target time interval. When the quantity of the corpus is large, after the knowledge extraction, the entity relationship of the each entity pair may correspond to a plurality of time intervals, for example, at least two time intervals. In order to ensure the accuracy and comprehensiveness of time intervals of each entity relationship in the knowledge graph, the fusion processing needs to be performed on the obtained plurality of time intervals. For example, a wrong time interval is removed, stitching or deduplication is performed on different time intervals in a chronological order.

Alternatively, the performing fusion on the plurality of time intervals to obtain the target time interval includes: screening the plurality of time intervals according to a confidence level of each time interval in the plurality of time intervals; and integrating the screened time intervals in a chronological order (e.g., performing stitching or deduplication on the time intervals), to obtain the target time interval. For example, a time interval having a confidence level lower than a confidence level threshold may be discarded, and then the screened time intervals are stitched in the chronological order to obtain a final from value and a final to value, thereby obtaining the target time interval. For a plurality of time intervals that time gaps exist therebetween and on which the stitching cannot be performed, the plurality of time intervals may be respectively served as independent target time intervals and correspond to the same entity relationship, which is equivalent to that currently a plurality of groups of multivariate data are extracted and obtained. Here, the confidence level of the each time interval may be determined according to a predetermined priority of the corpus source, for example, the higher the priority of the corpus source is, the higher the confidence level of the time interval extracted from the corpus is; or, by counting, in the corpus, the number of data sources corresponding to a given extracted time interval, the confidence level of the given extracted time interval may also be dynamically determined according to the number, which is not specifically limited in this embodiment. The corpus used in the knowledge extraction task may include a plurality of data sources, for example, web page texts of different websites. The plurality of data sources may respectively correspond to different corpus sources, or may correspond to the same corpus source. The corpus sources may be distinguished by information issuers.

For example, the screening the plurality of time intervals according to the confidence level of each time interval in the plurality of time intervals includes: counting, in the corpus, the number of data sources corresponding to the each time interval in the plurality of time intervals; determining the confidence level of the each time interval according to the number; and screening the plurality of time intervals according to the confidence level. For example, if a plurality of time intervals which are a, b and c respectively, the number of data sources, from which the time interval a is extracted, in the corpus is x1, the number of data sources, from which the time interval b is extracted, in the corpus is x2, the number of data sources, from which the time interval c is extracted, in the corpus is x3, and x1>x2>x3, the confidence levels of the time intervals a, b and c are reduced in sequence. A time interval having a confidence level less than the confidence level threshold may be discarded, and the confidence level threshold may be adaptively set.

Further, the method in this embodiment may further include: determining whether a null value exists at a time starting point and a time end point of the target time interval; and if the null value exists, determining a validity of the null value using candidate corpus from a source different from current corpus. That is, recognition for related time information is performed on the candidate corpus, to verify the null value in the time interval. If that the null value is invalid is determined, the null value is replaced with the time recognized from the candidate corpus, to ensure the reliability of the currently determined target time interval.

S103, generating a temporal knowledge graph based on the entity pair, the entity relationship and the target time interval of the entity relationship.

According to the technical solution of this embodiment, by simultaneously extracting the entity pair, the entity relationship and the target time interval of the entity relationship, an approach to generating a temporal knowledge graph based on a structured data format containing a time interval is proposed, and the formats of the data constructing the temporal knowledge graph are unified and normalized, such that the valid period of the entity relationship of the each entity pair may be accurately expressed in the temporal knowledge graph, and thus, the problem in the existing technology that the precision of expression of the time information in the knowledge graph is low is solved, thus improving the precision of expression of the time information. Moreover, the knowledge calculation in the time dimension may be supported based on the time interval of the entity relationship, thus improving the flexible use of the temporal knowledge. Furthermore, the temporal knowledge graph can support more abundant scenarios in which knowledge information needs to be provided.

Figure 2:
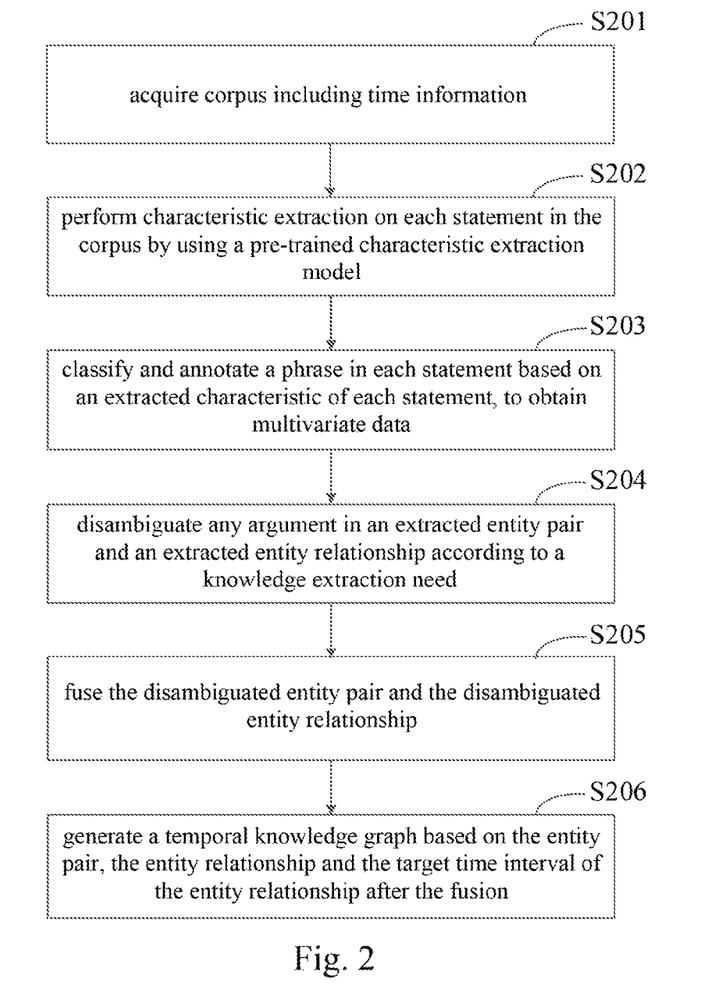
FIG. 2 is a flowchart of another method for generating a temporal knowledge graph disclosed according to an embodiment of the present disclosure.

FIG. 2 is a flowchart of another method for generating a temporal knowledge graph disclosed according to an embodiment of the present disclosure. This embodiment is further optimized and extended based on the above technical solution, and may be combined with the above various alternative implementations. As shown in FIG. 2, the method includes steps S201~S206 as described below.

S201, acquiring corpus including time information.

S202, performing characteristic extraction on each statement in the corpus by using a pre-trained characteristic extraction model.

S203, classifying and annotating a word in each statement based on an extracted characteristic of each statement, to obtain multivariate data.

Here, the multivariate data includes an entity pair, an entity relationship and a target time interval of the entity relationship, and the target time interval is used to indicate a period in which the entity relationship is valid. The characteristic extraction model may be implemented by any model in the existing technology that is capable of performing the characteristic extraction on the statement, which is not specifically limited in this embodiment. For example, a characteristic extraction model based on a bidirectional long short-term memory (LSTM) network is used. The characteristic of the each statement in the corpus is extracted by analyzing the context in the each statement in the corpus, and is expressed in a form of characteristic vector. Then, by classifying and annotating the phrase in the each statement, the phrase in the each statement is classified according to a plurality of arguments included in the multivariate data. Here, the classification and annotation on the phrase may be implemented by a pre-trained classification and annotation model, including, but not limited to, a classification and annotation model based on a conditional random field (CRF), etc. The phrase described in this embodiment includes a phrase composed of a single word.

In the process of extracting the multivariate data, the characteristic extraction and the classification and annotation may be performed respectively by using two trained models in the steps, or the characteristic extraction and the classification and annotation may be performed simultaneously by using a comprehensive model. Alternatively, the method of this embodiment further includes: training to obtain a multivariate data extraction model by using a training corpus set and an annotation result of multivariate data of each statement in the training corpus set, to perform the characteristic extraction and the classification and annotation using the multivariate data extraction model. Here, the multivariate data extraction model may be implemented based on a long short-term memory network and the conditional random field.

In addition, an annotation sequence adopted by the multivariate data extraction model in this embodiment may be a BIOE structure. By restricting the annotation result using the BIOE structure, the quality of the classification and annotation result of the phrase may be improved, and the annotation result having the complete BIOE structure is determined as a correct annotation result, that is, valid multivariate data. Otherwise, the annotation result is not to be used in the process of constructing the temporal knowledge graph.

S204, disambiguating, according to a knowledge extraction need, any argument in an extracted entity pair and an extracted entity relationship.

The purpose of the disambiguation is to avoid that the polysemy, the synonym or the like affects the accuracy of the extracted entity pair or of the extracted entity relationship. By analyzing the context information of the text to which the statement belongs, any argument in each entity pair and the extracted entity relationship are corresponded to a real entity pair or a real entity relationship. Here, the knowledge extraction need defines the target entity and the target entity relationship that currently need to be extracted.

S205, fusing the disambiguated entity pair and the disambiguated entity relationship.

Considering that there is a large amount of redundant information in the Internet, and the same knowledge may be mentioned in a plurality of data sources of the corpus, through the fusion, deduplication for the knowledge may be implemented and the same knowledge may be merged. For example, taking the argument object in the entity pair as an example, if the object is an entity, identical entities are fused. If the object is a non-entity, the object may be fused depending on a predefined dictionary and a predefined fusion approach. Here, the dictionary is a synonym or near-synonym database predefined based on a diversity of language expressions, and the fusion approach refers to a fusion processing strategy predefined according to the knowledge extraction need. For example, if the same semantics is expressed by using different phrase structures, the two phrases may be merged. The predefined dictionary and the predefined fusion approach may be used to assist determining whether a plurality of objects, as non-entities, substantially correspond to same object. Through post-processing operations such as a knowledge disambiguation operation and a knowledge fusion operation, the accuracy of the expression and the comprehensiveness of the knowledge of the multivariate data for constructing the temporal knowledge graph may be improved.

S206, generating a temporal knowledge graph, based on the entity pair, the entity relationship and the target time interval of the entity relationship after the fusion.

On the basis of the above technical solution, alternatively, performing a multivariate data extraction on the corpus includes: analyzing a topic or a text structure of a text in the corpus; and in response to the topic of the text belonging to a preset topic or the text structure belonging to a preset text structure, extracting the multivariate data by using different data extraction approaches.

For the corpus currently used for the knowledge extraction, a text topic may be determined by performing keyword recognition on and analyzing on each text, or each text structure may be analyzed using a text structure analysis technique. Considering a diversity of corpus sources and a diversity of language expressions, not all the multivariate data contained in the current corpus need to be extracted by using the pre-trained multivariate data extraction model uniformly. If the text structure of a specific text in the corpus is simple or relatively fixed, that is, the text structure belongs to a preset text structure, the multivariate data in the text may be quickly extracted by flexibly using different data extraction approaches, for this type of text. The preset topic refers to a topic of text content published using a simple text structure or a fixed text structure, the topic being predetermined according to a habit of publishing network content.

Further, the extracting the multivariate data using different data extraction approaches includes: extracting an entity relationship from a statement of the text according to a preset relationship extraction approach, the preset relationship extraction approach referring to a predefined approach for determining an entity relationship based on a knowledge extraction need; and obtaining the entity pair and the target time interval of the entity relationship by performing a characteristic extraction on the statement in the text and by classifying and annotating a word of the statement.

For example, the preset relationship extraction approach may refer to that the entity relationship is determined by recognizing and matching a keyword in the statement. Specifically, a set including a preset number of keywords may be predefined for each entity relationship according to the knowledge extraction need. As long as the statement includes a word in the set of the keywords, the entity relationship of the entity pair in the statement may be determined. The preset relationship extraction approach may also be implemented by using a pre-trained relationship extraction model specially used for extracting an entity relationship, for example, a relationship extraction model obtained by training using the training corpus set and the annotation result of the entity relationship in the each statement in the training corpus set. The preset relationship extraction approach may also refer to that the entity relationship is determined by performing a semantic analysis on the statement, which is particularly applicable to the implicit expression statement of the entity relationship. The entity pair and the target time interval of the entity relationship may be determined by using a pre-trained entity pair and time extraction model, and the process of training the model is consistent with the idea of the foregoing training for the model, which will not be repeatedly described here. In addition, the time interval of the entity relationship may also be determined through a manual input. When the entity relationship is first determined, the position of the keyword representing the entity relationship in the statement that the keyword belongs thereto may be used as an input of the entity pair and time extraction model, to assist extracting the entity pair and the target time interval of the entity relationship, thereby improving the accuracy of the knowledge extraction. Obviously, at this point, in the process of training the entity pair and time extraction model, the position of the keyword representing the entity relationship in the statement that the keyword belongs thereto also needs to be used as the input, to train the model.

In this embodiment, by distinguishing a text in the corpus according to the topic of the text or the text structure in the corpus, and flexibly and discriminatively extracting the entity pair, the target time interval of the entity relationship and the entity relationship by using different knowledge extraction approaches, which facilitate improving the efficiency of the knowledge extraction. Moreover, since the more the dimensions of the annotation data in the process of training an extraction model are, the higher the error rate of the output result of the training model is. Therefore, by discriminatively extracting, the dimensions of the annotation data in the process of training an extraction model are reduced, and thus, the error rate of the knowledge extraction may also be reduced.

According to the technical solution of this embodiment, according to the unified and normalized structured data format including a time interval, the multivariate data is obtained by performing the characteristic extraction on the each statement in the corpus and by classifying and annotating the phrase in the each statement, to construct the temporal knowledge graph, such that the problem in the existing technology that the precision of expression of the time information in the knowledge graph is low is solved, thus improving the precision of expression of the time information. Moreover, the accuracy and the comprehensiveness of the description for the knowledge in the temporal knowledge graph are improved through the disambiguation and the fusion. Furthermore, the solution in this embodiment supports flexibly and discriminatively extracting the data in the multivariate data according to the text structure and the topic of the text in the corpus and by using the different knowledge extraction approaches, which facilitates improving the efficiency and the accuracy of the knowledge extraction.

Figure 3:
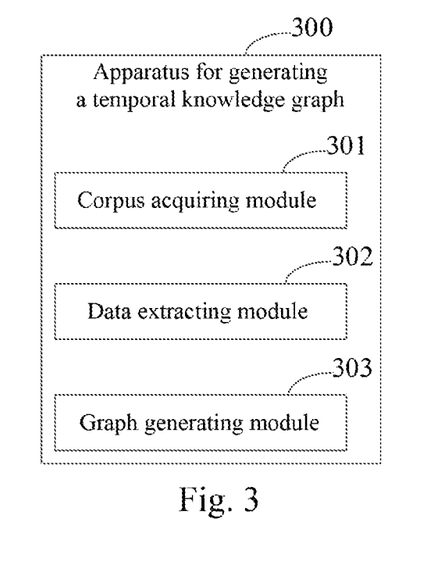
FIG. 3 is a schematic structural diagram of an apparatus for generating a temporal knowledge graph disclosed according to an embodiment of the present disclosure.

FIG. 3 is a schematic structural diagram of an apparatus for generating a temporal knowledge graph disclosed according to an embodiment of the present disclosure. This embodiment may be applicable to a situation where a temporal knowledge graph including time information is constructed by performing a knowledge extraction on corpus. The apparatus in this embodiment may be implemented by means of software and/or hardware, and may be integrated on any electronic device having a computing capability, for example, a server.

As shown in FIG. 3, the apparatus 300 for generating a temporal knowledge graph disclosed in this embodiment includes a corpus acquiring module 301, a data extracting module 302 and a graph generating module 303.

The corpus acquiring module 301 is configured to acquire corpus including time information.

The data extracting module 302 is configured to perform multivariate data extraction on the corpus, the multivariate data including an entity pair, an entity relationship and a target time interval of the entity relationship, and the target time interval being used to indicate a period in which the entity relationship is valid.

The graph generating module 303 is configured to generate a temporal knowledge graph based on the entity pair, the entity relationship and the target time interval of the entity relationship.

Alternatively, the data extracting module 302 includes: a time interval extracting unit, configured to obtain a plurality of time intervals of the entity relationship through the multivariate data extraction; and a target time interval determining unit, configured to perform fusion on the plurality of time intervals to obtain the target time interval.

Alternatively, the target time interval determining unit includes: a time interval screening subunit, configured to screen the plurality of time intervals according to a confidence level of each time interval in the plurality of time intervals; and a time interval integrating subunit, configured to integrate the screened time intervals in a chronological order, to obtain the target time interval.

Alternatively, the time interval screening subunit is specifically configured to: count, in the corpus, a number of data sources corresponding to the each time interval in the plurality of time intervals; and determine the confidence level of the each time interval according to the number; and screen the plurality of time intervals according to the confidence level.

Alternatively, the data extracting module 302 further includes: a time null value determining unit, configured to determine whether a null value exists at a time starting point and a time end point of the target time interval; and a null value validity determining unit, configured to determine, in response to the null value existing, a validity of the null value using candidate corpus from a source different from current corpus.

Alternatively, the data extracting module 302 includes: a characteristic extracting unit, configured to perform a characteristic extraction on each statement in the corpus, by using a pre-trained characteristic extraction model; and a word classifying and annotating unit, configured to classify and annotate, based on an extracted characteristic of the each statement, a phrase in the each statement to obtain the multivariate data.

Alternatively, the data extracting module 302 further includes: a model training unit, configured to train to obtain a multivariate data extraction model by using a training corpus set and an annotation result of multivariate data of each statement in the training corpus set, to perform the characteristic extraction and the classification and annotation using the multivariate data extraction model.

Alternatively, the data extracting module 302 further includes: a text topic or structure analyzing unit, configured to analyze a topic or a text structure of a text in the corpus; and a multivariate data extracting unit, configured to extract, in response to the topic of the text belonging to a preset topic or the text structure belonging to a preset text structure, the multivariate data by using different data extraction approaches.

Alternatively, the multivariate data extracting unit includes: an entity relationship extracting subunit, configured to extract the entity relationship from a statement of the text according to a preset relationship extraction approach, the preset relationship extraction approach referring to a predefined approach for determining an entity relationship based on a knowledge extraction need; and an entity pair and time interval extracting subunit, configured to obtain the entity pair and the target time interval of the entity relationship by performing a characteristic extraction on the statement in the text and by classifying and annotating a word of the statement.

Alternatively, the apparatus in this embodiment further includes: a disambiguating module, configured to disambiguate, according to a knowledge extraction need, any argument in the extracted entity pair and the extracted entity relationship; and a fusing module, configured to fuse the disambiguated entity pair and the disambiguated entity relationship.

Alternatively, the corpus acquiring module 301 is specifically configured to: obtain the corpus including the time information by recognizing the time information, where the time information includes time recorded in a body text of the corpus, push time of corpus data, update time of the corpus data, and time indirectly acquired based on a corpus source.

Alternatively, the multivariate data is in a form of five-tuple data, including respectively a subject, an entity relationship, an object, a relationship validity time starting point, and a relationship failure time end point.

The apparatus 300 for generating a temporal knowledge graph disclosed in the embodiment of the present disclosure may perform the method for generating a temporal knowledge graph disclosed in embodiments of the present disclosure, and possesses the functional modules for performing the method and the corresponding beneficial effects. For the content not described in detail in this embodiment, reference may be made to the description in any embodiment of the method of the present disclosure.

According to embodiments of the present disclosure, an electronic device and a readable storage medium are provided.

Figure 4:
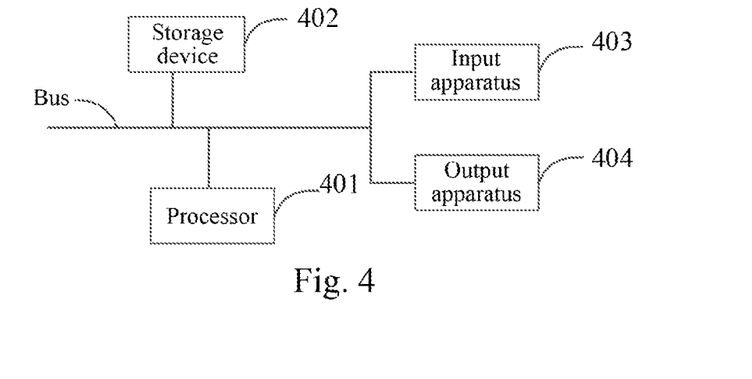
FIG. 4 is a block diagram of an electronic device disclosed according to an embodiment of the present disclosure.

As shown in FIG. 4, FIG. 4 is a block diagram of an electronic device adapted to implement a method for generating a temporal knowledge graph in embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may also represent various forms of mobile apparatuses such as personal digital processor, a cellular telephone, a smart phone, a wearable device and other similar computing apparatuses. The parts shown herein, their connections and relationships, and their functions are only as examples, and not intended to limit implementations of embodiments of the present disclosure as described and/or claimed herein.

As shown in FIG. 4, the electronic device includes one or more processors 401, a storage device 402, and an interface for connecting parts, the interface including a high speed interface and a low speed interface. The parts are interconnected using different buses, and may be mounted on a common motherboard or in other ways as needed. The processors may process an instruction executed within the electronic device, the instruction including an instruction stored in the storage device or on the storage device to display graphical information of a graphical user interface (GUI) on an external input/output apparatus such as a display device coupled to the interface. In other implementations, a plurality of processors and/or a plurality of buses may be used, if desired, along with a plurality of storage devices. Also, a plurality of electronic devices may be connected, and each device provides a portion of necessary operations (e.g., as a server array, a group of blade servers or a multi-processor system). In FIG. 4, one processor 401 is taken as an example.

The storage device 402 is a non-transitory computer readable storage medium provided in embodiments of the present disclosure. Here, the storage device stores an instruction executable by at least one processor, to cause the at least one processor to perform the method for generating a temporal knowledge graph provided in embodiments of the present disclosure. The non-transitory computer readable storage medium in embodiments of the present disclosure stores a computer instruction, the computer instruction being used to cause a computer to perform the method for generating a temporal knowledge graph provided in embodiments of the present disclosure.

As the non-transitory computer readable storage medium, the storage device 402 may be used to store a non-transitory software program, a non-transitory computer executable program and a module such as a program instruction/module (e.g., the corpus acquiring module 301, the data extracting module 302 and the graph generating module 303 shown in FIG. 3) corresponding to the method for generating a temporal knowledge graph in embodiments of the present disclosure. The processor 401 executes various functional applications and data processing of the server by running the non-transitory software program, the instruction and the module stored in the storage device 402, i.e., implements the method for generating a temporal knowledge graph in the above embodiments of the method.

The storage device 402 may include a storage program area and a storage data area. Here, the storage program area may store an operating system and an application program required for at least one function. The storage data area may store data, etc. created according to the use of the electronic device of the method for generating a temporal knowledge graph. In addition, the storage device 402 may include a high speed random access memory, and may also include a non-transitory storage device, for example, at least one magnetic disk storage device, a flash storage device, or other non-transitory solid state storage devices. In some embodiments, the storage device 402 may alternatively include a storage device disposed remotely relative to the processor 401. The remote storage device may be connected to the electronic device adapted to implement the method for generating a temporal knowledge graph in the embodiments, via a network. Examples of such network include, but not limited to, the Internet, an enterprise intranet, a local area network, a mobile communication network, and a combination thereof.

The electronic device adapted to implement the method for generating a temporal knowledge graph in the embodiments may further include: an input apparatus 403 and an output apparatus 404. The processor 401, the storage device 402, the input apparatus 403 and the output apparatus 404 may be connected via a bus or in other ways. In FIG. 4, the connection via a bus is taken as an example.

The input apparatus 403 may receive an inputted number or inputted character information, and generate a key signal input related to the user setting and functional control of the electronic device adapted to implement the method for generating a temporal knowledge graph in the embodiments. For example, the input apparatus is a touch screen, a keypad, a mouse, a track pad, a touch pad, a pointing stick, one or more mouse buttons, a track ball, a joystick, or the like. The output apparatus 404 may include a display device, an auxiliary lighting apparatus (e.g., a light emitting diode (LED)), a tactile feedback apparatus (e.g., a vibration motor), etc. The display device may include, but not limited to, a liquid crystal display (LCD), an LED display, and a plasma display. In some embodiments, the display device may be a touch screen.

Various embodiments of the systems and technologies described herein may be implemented in digital electronic circuit systems, integrated circuit systems, dedicated application specific integrated circuits (ASIC), computer hardware, firmware, software, and/or combinations thereof. These various embodiments may include: being implemented in one or more computer programs that may be executed and/or interpreted on a programmable system that includes at least one programmable processor. The programmable processor may be a dedicated or general purpose programmable processor, and may receive data and instructions from a memory system, at least one input apparatus, and at least one output apparatus, and transmit the data and instructions to the storage system, the at least one input apparatus, and the at least one output apparatus.

These computing programs, also referred to as programs, software, software disclosures, or codes, include machine instructions of a programmable processor, and may be implemented using high-level procedures and/or object-oriented programming languages, and/or assembly/machine languages. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

To provide interaction with a user, the systems and technologies described herein may be implemented on a computer, the computer has: a display apparatus for displaying information to the user, such as a Cathode Ray Tube (CRT) or an liquid crystal display (LCD) monitor; and a keyboard and pointing apparatus, such as a mouse or a trackball, and a user may use the keyboard and the pointing apparatus to provide input to the computer. Other types of apparatuses may also be used to provide interaction with the user. For example, the feedback provided to the user may be any form of sensory feedback, such as visual feedback, auditory feedback, or tactile feedback; and any form (including acoustic input, voice input, or tactile input) may be used to receive input from the user.

The systems and technologies described herein may be implemented in a computing system that includes backend components, e.g., as a data server, or in a computing system that includes middleware components, e.g., an application server, or in a computing system including front-end components, e.g., a user computer having a graphical user interface or a web browser through which a user may interact with embodiments of the systems and technologies described herein, or in a computing system including any combination of such backend components, middleware components, or front-end components. The components of the system may be interconnected by any form or medium of digital data communication, e.g., a communication network. Examples of communication networks include: Local Area Network (LAN), Wide Area Network (WAN), the Internet, and block chain networks.

The computer system may include a client and a server. The client and server are generally far from each other and usually interact through a communication network. The relationship between the client and the server is generated by computer programs that run on the corresponding computer and having a client-server relationship with each other.

According to the technical solution of embodiments of the present disclosure, by simultaneously extracting an entity pair, an entity relationship and a target time interval of the entity relationship, an approach to generating a temporal knowledge graph based on a structured data format containing a time interval is proposed, and formats of data constructing the temporal knowledge graph are unified and normalized, such that the valid period of the entity relationship of each entity pair may be accurately expressed in the temporal knowledge graph, and thus, the problem in the existing technology that the precision of expression of the time information in the knowledge graph is low is solved, thus improving the precision of expression of the time information. Moreover, the knowledge calculation in the time dimension may be supported based on the time interval of the entity relationship, thus improving the flexible use of the temporal knowledge.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

The invention claimed is:

1. A method for generating a temporal knowledge graph, comprising:
   acquiring a corpus including time information from a source including a web page;
   performing multivariate data extraction on the corpus to obtain multivariate data, the multivariate data including an entity pair, an entity relationship and a target time interval of the entity relationship, the target time interval being used to indicate a valid period of the entity relationship; and
   generating the temporal knowledge graph based on the entity pair, the entity relationship and the target time interval of the entity relationship;
   wherein extracting the target time interval of the entity relationship comprises:
      obtaining a plurality of time intervals of the entity relationship through the multivariate data extraction; and
      performing fusion on the plurality of time intervals to obtain the target time interval, and
   wherein after the target time interval is obtained by performing fusion on the plurality of time intervals, the method further comprises:
      determining whether a null value exists at a time starting point and a time end point of the target time interval;
      in response to determining that the null value exists at the time starting point and the time end point of the target time interval, determining a validity of the null value using a candidate corpus from a source different from a source of the corpus; and
      in response to determining that the null value is invalid, replacing the null value with a time recognized from the candidate corpus.

2. The method according to claim 1, wherein the performing fusion on the plurality of time intervals to obtain the target time interval comprises:
   screening the plurality of time intervals according to a confidence level of each time interval in the plurality of time intervals, to obtain screened time intervals; and
   integrating the screened time intervals in a chronological order, to obtain the target time interval.

3. The method according to claim 2, wherein the screening the plurality of time intervals according to the confidence level of each time interval in the plurality of time intervals comprises:
   counting, in the corpus, a number of data sources corresponding to the each time interval in the plurality of time intervals;
   determining the confidence level of the each time interval according to the number; and
   screening the plurality of time intervals according to the confidence level.

4. The method according to claim 1, wherein before performing multivariate data extraction on the corpus, the method further comprises:
   screening the corpus according to reliability of the source of the corpus, quality of text content and preset conditions of text topic type.

5. The method according to claim 1, wherein the performing multivariate data extraction on the corpus comprises:
   performing characteristic extraction on each statement in the corpus to obtain an extracted characteristic of the each statement, by using a pre-trained characteristic extraction model; and
   classifying and annotating, based on the extracted characteristic of the each statement, a phrase in the each statement to obtain the multivariate data.

6. The method according to claim 5, further comprising:
   training to obtain a multivariate data extraction model by using a training corpus set and an annotation result of multivariate data of each statement in the training corpus set, to perform the characteristic extraction and the classification and annotation using the multivariate data extraction model.

7. The method according to claim 1, wherein the performing multivariate data extraction on the corpus comprises:
   analyzing a topic or a text structure of a text in the corpus; and
   in response to the topic of the text belonging to a preset topic or the text structure belonging to a preset text structure, extracting the entity relationship by using a preset relationship extraction approach.

8. The method according to claim 7, wherein the extracting the entity relationship by using the preset relationship extraction approach comprises:
   extracting the entity relationship from a statement in the text according to the preset relationship extraction approach, the preset relationship extraction approach referring to a predefined approach for determining an entity relationship based on a knowledge extraction need; and
   obtaining the entity pair and the target time interval of the entity relationship by performing a characteristic extraction on the statement in the text and by classifying and annotating a word of the statement.

9. The method according to claim 1, wherein after the performing multivariate data extraction on the corpus to obtain the multivariate data extraction, the method further comprises:

disambiguating, according to a knowledge extraction need, any argument in the entity pair and the entity relationship, to obtain disambiguated entity pair and disambiguated entity relationship; and fusing the disambiguated entity pair and the disambiguated entity relationship.

10. The method according to claim 1, wherein the acquiring a corpus including time information comprises:

obtaining the corpus including the time information by recognizing the time information, wherein the time information includes time recorded in a body text of the corpus, push time of corpus data, update time of the corpus data, or time indirectly acquired based on a corpus source.

11. The method according to claim 1, wherein the multivariate data is in a form of five-tuple data, including respectively a subject, an entity relationship, an object, a relationship validity time starting point, and a relationship failure time end point.

12. An electronic device, comprising:

at least one processor; and a storage, wherein the storage stores at least one instruction that, when executed by the at least one processor, causes the at least one processor to perform operations, the operations comprising:

acquiring a corpus including time information from a source including a web page;

performing multivariate data extraction on the corpus to obtain multivariate data, the multivariate data including an entity pair, an entity relationship and a target time interval of the entity relationship, the target time interval being used to indicate a valid period of the entity relationship; and generating a temporal knowledge graph based on the entity pair, the entity relationship and the target time interval of the entity relationship, wherein extracting the target time interval of the entity relationship comprises:

obtaining a plurality of time intervals of the entity relationship through the multivariate data extraction; and performing fusion on the plurality of time intervals to obtain the target time interval, and wherein after the target time interval is obtained by performing fusion on the plurality of time intervals, the operations further comprise:

determining whether a null value exists at a time starting point and a time end point of the target time interval;

in response to determining that the null value exists at the time starting point and the time end point of the target time interval, determining a validity of the null value using a candidate corpus from a source different from a source of the corpus; and in response to determining that the null value is invalid, replacing the null value with a time recognized from the candidate corpus.

13. The electronic device according to claim 12, wherein the performing fusion on the plurality of time intervals to obtain the target time interval comprises:

screening the plurality of time intervals according to a confidence level of each time interval in the plurality of time intervals, to obtain screened time intervals; and integrating the screened time intervals in a chronological order, to obtain the target time interval.

14. The electronic device according to claim 13, wherein the screening the plurality of time intervals according to the confidence level of each time interval in the plurality of time intervals comprises:

counting, in the corpus, a number of data sources corresponding to the each time interval in the plurality of time intervals;

determining the confidence level of the each time interval according to the number; and screening the plurality of time intervals according to the confidence level.

15. The electronic device according to claim 12, wherein before performing multivariate data extraction on the corpus, the operations further comprise:

screening the corpus according to reliability of the source of the corpus, quality of text content and preset conditions of text topic type.

16. The electronic device according to claim 12, wherein the performing multivariate data extraction on the corpus comprises:

performing characteristic extraction on each statement in the corpus to obtain an extracted characteristic of the each statement, by using a pre-trained characteristic extraction model; and classifying and annotating, based on the extracted characteristic of the each statement, a phrase in the each statement to obtain the multivariate data.

17. The electronic device according to claim 16, wherein the operations further comprise:

training to obtain a multivariate data extraction model by using a training corpus set and an annotation result of multivariate data of each statement in the training corpus set, to perform the characteristic extraction and the classification and annotation using the multivariate data extraction model.

18. A non-transitory computer readable storage medium, storing at least one computer instruction that, when executed by a processor, causes the processor to perform operations, the operations comprising:

acquiring a corpus including time information from a source including a web page;

performing multivariate data extraction on the corpus to obtain multivariate data, the multivariate data including an entity pair, an entity relationship and a target time interval of the entity relationship, the target time interval being used to indicate a valid period of the entity relationship; and generating a temporal knowledge graph based on the entity pair, the entity relationship and the target time interval of the entity relationship, wherein extracting the target time interval of the entity relationship comprises:

obtaining a plurality of time intervals of the entity relationship through the multivariate data extraction; and performing fusion on the plurality of time intervals to obtain the target time interval, and wherein after the target time interval is obtained by performing fusion on the plurality of time intervals, the operations further comprise:

determining whether a null value exists at a time starting point and a time end point of the target time interval;

in response to determining that the null value exists at the time starting point and the time end point of the target time interval, determining a validity of the null value using a candidate corpus from a source different from a source of the corpus; and in response to determining that the null value is invalid, replacing the null value with a time recognized from the candidate corpus.

\* \* \* \* \*